United States Patent
Oh et al.

(10) Patent No.: US 9,866,332 B2
(45) Date of Patent: Jan. 9, 2018

(54) RECEIVER FOR HUMAN BODY COMMUNICATION AND METHOD FOR REMOVING NOISE THEREOF

(71) Applicant: ELECTRONICS AND TELECOMMUNICATIONS RESEARCH INSTITUTE, Daejeon (KR)

(72) Inventors: Kwang IL Oh, Daejeon (KR); Tae Wook Kang, Daejeon (KR); Sung Eun Kim, Daejeon (KR); Hyung-IL Park, Daejeon (KR); Sung Weon Kang, Daejeon (KR); In Gi Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/419,871

(22) Filed: Jan. 30, 2017

(65) Prior Publication Data
US 2017/0264374 A1   Sep. 14, 2017

(30) Foreign Application Priority Data

Mar. 9, 2016   (KR) .................. 10-2016-0028434
Aug. 11, 2016  (KR) .................. 10-2016-0102582

(51) Int. Cl.
*H04B 5/00*    (2006.01)
*H04B 13/00*   (2006.01)
*H04B 15/00*   (2006.01)

(52) U.S. Cl.
CPC ......... *H04B 13/005* (2013.01); *H04B 15/005* (2013.01)

(58) Field of Classification Search
CPC . H01L 2924/00013; H01L 2224/05099; H01L 2224/05599; H01L 2224/13099; H01L 2224/0401; H01L 2224/04105; H01L 2224/06182; H01L 2224/16225; H01L 2224/16227; H01L 23/3114; H01L 23/481;
(Continued)

(56) References Cited

U.S. PATENT DOCUMENTS 5,898,324 A * 4/1999 Yanagisawa ..... G01R 19/16519
327/77
8,320,429 B2   11/2012 Kang et al.
(Continued)

FOREIGN PATENT DOCUMENTS

JP   2000-031380 A   1/2000
KR   10-0889733 B1   3/2009
(Continued)

*Primary Examiner* — Golam Sorowar

(57) ABSTRACT

Provided is a receiver for human body communication, the receiver including a comparator, a clock and data recovery circuit, and resistors or passive elements having a resistance property in power supply and ground connection units of other digital operation components and a power supply and ground connection unit of a printed circuit board (PCB) to remove or suppress a digital noise reflowed into a human body in the receiver and to raise reception performance by amplifying, with a high gain, a very small transmission signal transmitted through the human body causing a very high loss.

4 Claims, 12 Drawing Sheets

(58) Field of Classification Search
CPC ............ H01L 23/49827; H01L 23/525; H04B 13/005
See application file for complete search history.

(56) References Cited

U.S. PATENT DOCUMENTS

| | | | |
|---|---|---|---|
| 8,508,396 B2 | 8/2013 | Enami et al. | |
| 9,065,558 B2 | 6/2015 | Song et al. | |
| 9,425,905 B2* | 8/2016 | Lee | H04B 13/005 |
| 2007/0211828 A1* | 9/2007 | Song | H03K 5/003 375/316 |
| 2010/0007701 A1* | 1/2010 | Lee | B41J 2/14 347/50 |
| 2010/0074257 A1 | 3/2010 | Lim | |
| 2010/0142889 A1 | 6/2010 | Kwon et al. | |
| 2010/0225332 A1* | 9/2010 | Niwa | H03K 17/9502 324/652 |
| 2011/0187447 A1* | 8/2011 | Iacob | G05F 1/10 327/543 |
| 2011/0195853 A1* | 8/2011 | Kavusi | G01N 33/558 506/9 |
| 2012/0003929 A1* | 1/2012 | Hyoung | G06F 1/3231 455/41.1 |
| 2012/0212870 A1* | 8/2012 | Necco | H02H 11/002 361/86 |
| 2013/0214957 A1* | 8/2013 | Mizuno | H03M 1/1009 341/155 |
| 2014/0203454 A1* | 7/2014 | Tago | H01L 23/49827 257/774 |

FOREIGN PATENT DOCUMENTS

| | | |
|---|---|---|
| KR | 10-2010-0045126 A | 5/2010 |
| KR | 10-2010-0120042 A | 11/2010 |
| KR | 10-1196981 B1 | 11/2012 |

* cited by examiner $I_{PEAK1} = VCCD/R2$   Time constant $= R2 \times C$ $I_{PEAK2} = VCCD/(2R + R2)$    Time constant $= (2R + R2) \times C$

RECEIVER FOR HUMAN BODY COMMUNICATION AND METHOD FOR REMOVING NOISE THEREOF

CROSS-REFERENCE TO RELATED APPLICATIONS

This U.S. non-provisional patent application claims priority under 35 U.S.C. §119 of Korean Patent Application Nos. 10-2016-0028434, filed on Mar. 9, 2016, and 10-2016-0102582, filed on Aug. 11, 2016, the entire contents of which are hereby incorporated by reference.

BACKGROUND

The present disclosure relates to human body communication, and more particularly, to a receiver for human body communication and a method for removing a noise thereof for removing a radiation noise radiated from the receiver itself in order to raise reception performance of a signal received by using a human body as a medium and stably recovering a signal having been transmitted from a transmitter.

Since transmission/reception of a signal using a human body as a medium does not require a transmission line of high conductivity for signal transmission, it is difficult to eavesdrop on the signal, and high frequency generation for wireless transmission, a modulator and a demodulator are not necessary. Thus the human body communication is a method of signal transmission which has a simple structure and operates with low power consumption. Since the signal transmission/reception using a human body as a medium uses a transmission medium having low conductivity due to nature of the human body medium, an analog amplifier having a very high gain is typically necessary to receive and recover a signal. In addition, since the human body itself operates as an antenna and thus surrounding noises absorbed from surroundings are added to a signal having been transmitted from a transmitter and the resulted signal is received by a receiver, the receiver is typically provided with a band pass filter for passing only the signal having been transmitted from the transmitter and filtering out unnecessary noises, and recovers the original transmitted data.

On the other hand, a clock is necessary for operation of a digital modem for data transmission between a transmitter and a receiver, and the clock operates on the basis of an identical frequency for synchronization of transmission/reception. However, since each of the transmitter and receiver uses an independent frequency oscillator, minute frequency and phase errors occur and in order to remove such frequency and phase errors, a clock and data recovery circuit in the receiver recovers a clock precisely synchronized with a frequency of the transmitter and the receiver uses the clock.

Accordingly, the receiver operates, transmission/reception synchronization is achieved, and then data is recovered on the basis of a frequency identical to an operation frequency of the transmitter and a transmission rate of a digital data signal flowing into the human body from the transmitter. In other words, since the receiver uses the same frequency band as that of the transmitter, a digital noise generated in the receiver is radiated in the air and flowed into human epidermis adjacent to a position on which the receiver is attached, a band pass filter in the receiver does not filter out the flowed digital noise induced by the receiver, and thus only a corresponding frequency band signal is amplified at the moment when passing an analog amplifier of a high gain. Accordingly, when the analog amplifier of a high gain is used, oscillation occurs at a sync frequency of the transmitter/receiver and a signal having been transmitted from the transmitter may not be recovered.

SUMMARY

The present disclosure provides a receiver for human body communication and a method for removing a noise thereof for effectively removing a digital noise generated in a receiver and flowing again into a human body in signal transmission/reception with the human body used as a medium, and basically suppressing the digital noise that is not filtered out by a band pass filter in the receiver.

The present disclosure also provides a receiver for human body communication and a method for removing a noise thereof capable of stably recovering a transmission signal transmitted from a transmitting device through a human body causing a very large loss by removing a digital noise generated in a receiver to enable a reception amplification circuit having a high gain to be implemented.

An embodiment of the inventive concept provides a receiver for performing human body communication, the receiver including: a reception stage analog circuit unit connected between a first power supply terminal and a first ground terminal and configured to receive a signal from a reception electrode attached on a human body, amplify and filter the received signal; a reception stage digital circuit unit connected between a second power supply terminal and a second ground terminal, and configured to digitally process a signal output from the reception stage analog circuit unit; and a power supplying circuit configured to generate a first power supply voltage, a second power supply voltage, a first ground voltage, and a second ground voltage, wherein the second power supply voltage is provided to the second power supply terminal via a first resistor or a first passive element, or the second ground voltage is provided to the second ground terminal via a second resistor or a second passive element.

In an embodiments of the inventive concept, a receiver for performing human body communication, includes: a reception electrode attached on a human body; an impedance matching circuit configured to receive a transmission signal from the reception electrode and perform impedance matching; a signal amplifying circuit configured to amplify a signal output from the impedance matching circuit; a band pass filter configured to filter a signal output from the signal amplifying circuit; a comparator configured to amplify a voltage level of a signal output from the band pass filter; a clock and data recovery circuit configured to recover data and a clock from a signal output from the comparator using a reception clock; a digital modem configured to recover reception information from the data and the clock output from the clock and data recovery circuit; a first power supply terminal configured to provide a first power supply voltage to the impedance matching circuit, the signal amplifying circuit and the band pass filter; a second power supply terminal configured to provide a second power supply voltage to the comparator, the clock and data recovery circuit, and the digital modem; a first ground terminal configured to provide a first ground voltage to the impedance matching circuit, the signal amplifying circuit and the band pass filter; a second ground terminal configured to provide a second ground voltage to the comparator, the clock and data recovery circuit, and the digital modem; and a power supplying circuit for generating the first power supply voltage, the second power supply voltage, the first ground voltage, and the second ground voltage, wherein a first resistor or a first passive element is connected between the second power supply terminal and at least one of the comparator, the clock and data recovery circuit and the digital modem, and a second resistor or a second passive element is connected between the second ground terminal and at least one of the comparator, the clock and data recovery circuit and the digital modem.

In an embodiments of the inventive concept, a method for removing a noise of a receiver for performing human body communication includes: amplifying and filtering a signal received from a reception electrode attached on a human body; and removing a digital radiation noise on the basis of a resistor or a passive element between a power supply terminal and at least one digital component or between a ground terminal and the at least one digital component, and digitally processing the filtered signal.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
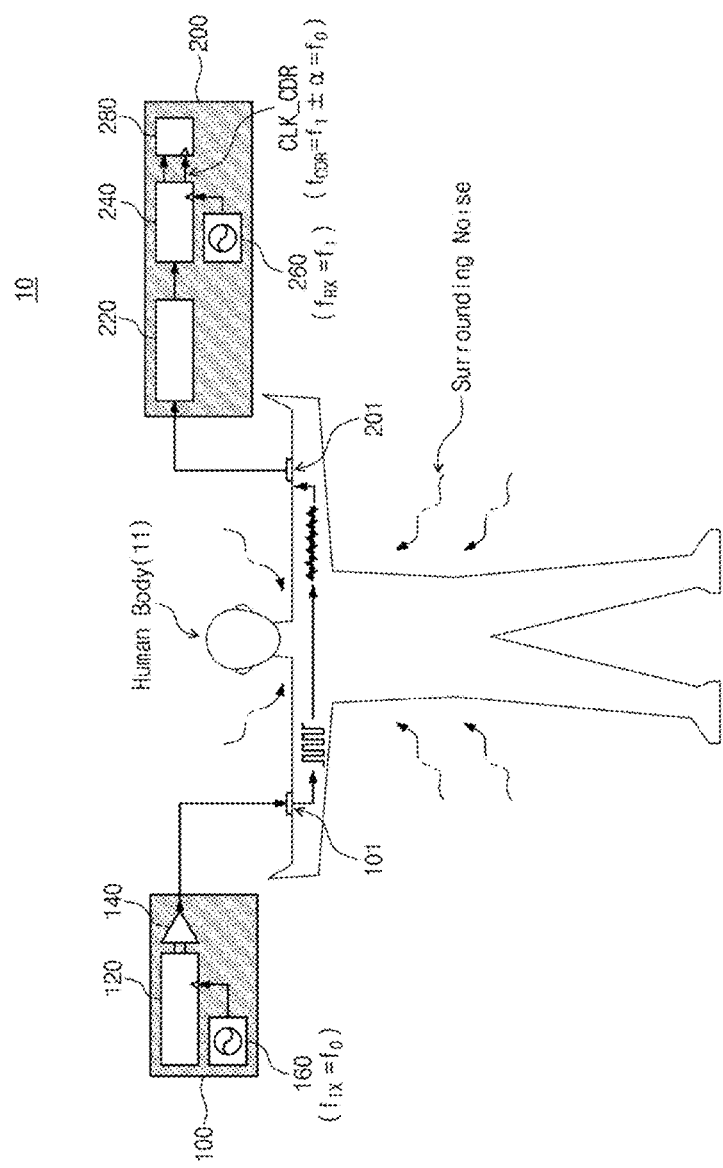
FIG. 1 is a block diagram of a human body communication system exemplarily showing signal transmission/reception using a human body as a medium and a correlation of operation frequencies between a transmitter and a receiver.

Hereinafter, an exemplary embodiment of the present disclosure will be described in detail with reference to the accompanying drawings such that a person skilled in the art may easily carry out the embodiments of the present disclosure.

Since various changes may be made and several forms may be embodied in the embodiments according to the concept of the present disclosure, the embodiments are intended to be illustrated in the drawings and described in detail herein. However, the present disclosure is not limited to the specific disclosed forms, and needs to be construed to include all modifications, equivalents, or replacements included in the spirit and technical range of the present disclosure.

It will be understood that, although the terms first, second, etc. may be used herein to describe various elements, these elements should not be limited by these terms. The above terms are used only to distinguish one component from another. For example, a first component may be referred to as a second component and likewise a second component may be referred to as a first component without departing from the scope of rights according to the concept of the present disclosure.

It will be understood that when an element is referred to as being "connected" or "coupled" to another element, it may be directly connected or coupled to the other element or intervening elements may be present. In the meantime, when it is mentioned that one component is "directly connected" or "directly accessed" to another component, it may be understood that no component is interposed therebetween. Other words used to describe the relationship between elements should be interpreted in a like fashion, e.g., "between" versus "directly between", "adjacent" versus "directly adjacent", etc.

Terms used herein are provided for merely explaining specific embodiments of the present disclosure, not limiting the disclosure. As used herein, the singular forms "a," "an"

and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, components or combinations thereof, but do not preclude the presence or addition of one or more other features, integers, steps, operations, elements, components, or combinations thereof.

Unless otherwise defined, all terms used herein including technical or scientific terms are same as those generally understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a human body communication system exemplarily showing signal transmission/reception using a human body as a medium and a correlation of operation frequencies between a transmitter and a receiver. Referring to FIG. 1, a human body communication system 10 may include a transmitter 100 provided with a transmission electrode 101 for transmitting a signal using a human body 11 as a medium and a receiver 200 provided with a reception electrode 201.

In an embodiment, the transmission electrode 101 of the receiver 100 may be attached on the epidermis of the human body 11 to transmit a signal. Here, the transmitted signal may be a baseband signal of a rectangular wave.

The transmitter 100 may include a transmission digital modem 120, a transmission electrode driving circuit 140 and a transmission clock generator 160. The transmission digital modem 120 may generate transmission data and may transmit the generated transmission data to the transmission electrode driving circuit 140 in response to the transmission clock (e.g transmission frequency, fTX=f0). The transmission electrode driving circuit 140 may be driven to transmit the transmission data transmitted from the transmission digital modem 120 to the transmission electrode 101 and the human body 11. The transmission clock oscillator 160 may provide a transmission clock to the transmission digital modem 120.

In an embodiment, the reception electrode 201 of the receiver 200 may be attached on the epidermis of the human body 11. Here, the received signal is basically shown as a form of the baseband signal of the rectangular wave, but may shown in a distorted signal type by being mixed with noises surrounding the human body 11 and attenuated through the human body 11.

The receiver 200 may include a reception stage analog circuit unit 220, a clock and data recovery circuit (CDR) 240, a reception clock generator 260 and a digital modem 280.

The reception stage analog circuit unit 220 may be implemented to allow a signal having been transmitted to the reception electrode 201 to be amplified to a proper magnitude and to band-pass.

The clock and data recovery circuit 240 may be implemented to recover a clock CLK_CDR and data for a signal received by the reception analog circuit unit 220 using a reception clock (e.g. reception frequency, fRX=f1). For example, the clock and data recovery circuit 240 may correct frequency and phase errors with the received data on the basis of the reception clock generated by the reception clock generator 260 in the receiver 200, output a recovery clock CLK_CDR (fCDR=f1±α=f0) precisely synchronized with a clock of the transmitter 100, and may provide the corrected data and recovery clock CLK_CDR to the digital modem 280.

The digital modem 280 may be implemented to receive and process the corrected data and the recovery clock CLK_CDR output from the clock and data recovery circuit 240.

In the human body communication system 10 illustrated in FIG. 1, the transmitter 100 and the receiver 200 basically use an identical clock frequency f0, but have respectively independent oscillators. Therefore minute frequency and phase errors between the transmitter 100 and the receiver 200 may be corrected by the clock and data recovery circuit 240 to be provided to the digital modem 280 of the receiver 200.

On the other hand, positions of the transmitter 100 and the receiver 200 illustrated in FIG. 1 are just an embodiment. It will be understood that positions of the transmitter 100, the receiver 200 and the transmission/reception electrodes 101 and 201 attached on the human body are not limited to any portion of the human body 11.

Figure 2:
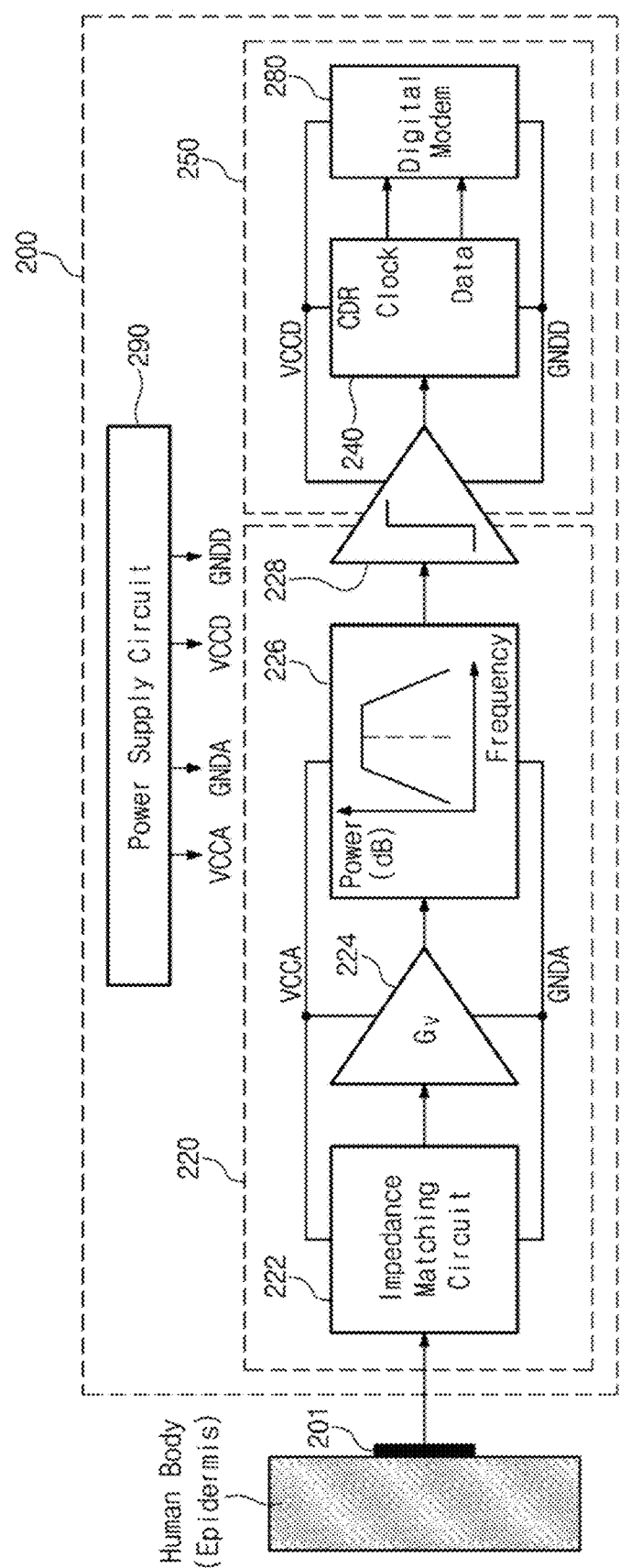
FIG. 2 exemplarily illustrates the receiver illustrated in FIG. 1.

FIG. 2 exemplarily illustrates the receiver 200 illustrated in FIG. 1. Referring to FIG. 2, the receiver 200 may include a reception stage analog circuit unit 220, a clock and data recovery circuit 240, a digital modem 280 and a power supply circuit 290. In addition, the receiver 200 may further include a reception electrode 201 attached on the human body 11 in order to receive a signal from the human body 11.

The reception analog circuit unit 220 may include an impedance matching circuit 222, a signal amplifying circuit 224, a band pass filter 226, and a part of a comparator 228.

The reception stage analog circuit unit 222 may be implemented to perform impedance matching for transmitting a maximum signal between the human body 11 and the signal amplifying circuit 224.

The signal amplifying circuit 224 may be implemented to amplify the magnitude of an attenuated signal.

The band pass filter 226 may be implemented to filter out a noise signal other than a frequency band of the reception signal from the signal output from the signal amplifying circuit 224.

The comparator 228 may be implemented to amplify a signal output from the band pass filter 226 to a power supply voltage level that is easy to use in the clock and data recovery circuit 240.

The clock and data recovery circuit 240 may be implemented to recover data and a clock from the received signal by using a reception clock.

The digital modem 280 may be implemented to recover finally received information (or reception information) from a recovered clock and data output from the clock and data recovery circuit 240.

On the other hand, the receiver 200 may be largely divided into the reception stage analog circuit unit 220 and a reception stage digital circuit unit 250 according to an operation of the receiver 200. Here, the reception stage digital circuit unit 250, as illustrated in FIG. 2, may include the remaining part of the comparator 228, the clock and data recovery circuit 240 and the digital modem 280.

In an embodiment, a power supply voltage VCCD and a ground voltage GNDD of each of components 228, 240, and 280 in the reception stage digital circuit unit 250 may be separated from a power supply voltage VCCA and a ground GNDA of the reception stage analog circuit unit 220 to be provided such that a switching noise does not cause an interference on an analog power supply.

The power supply circuit 290 may be implemented to provide a first power supply voltage VCCA and a first ground voltage GNDA for analog use only to each component 222, 224 or 226 of the reception stage analog circuit 220. In addition, the power supply circuit 290 may be implemented to provide a second power supply voltage VCCD and a second ground voltage GNDD for digital use only to each component 240 or 280 of the reception stage digital circuit 250.

Figure 3:
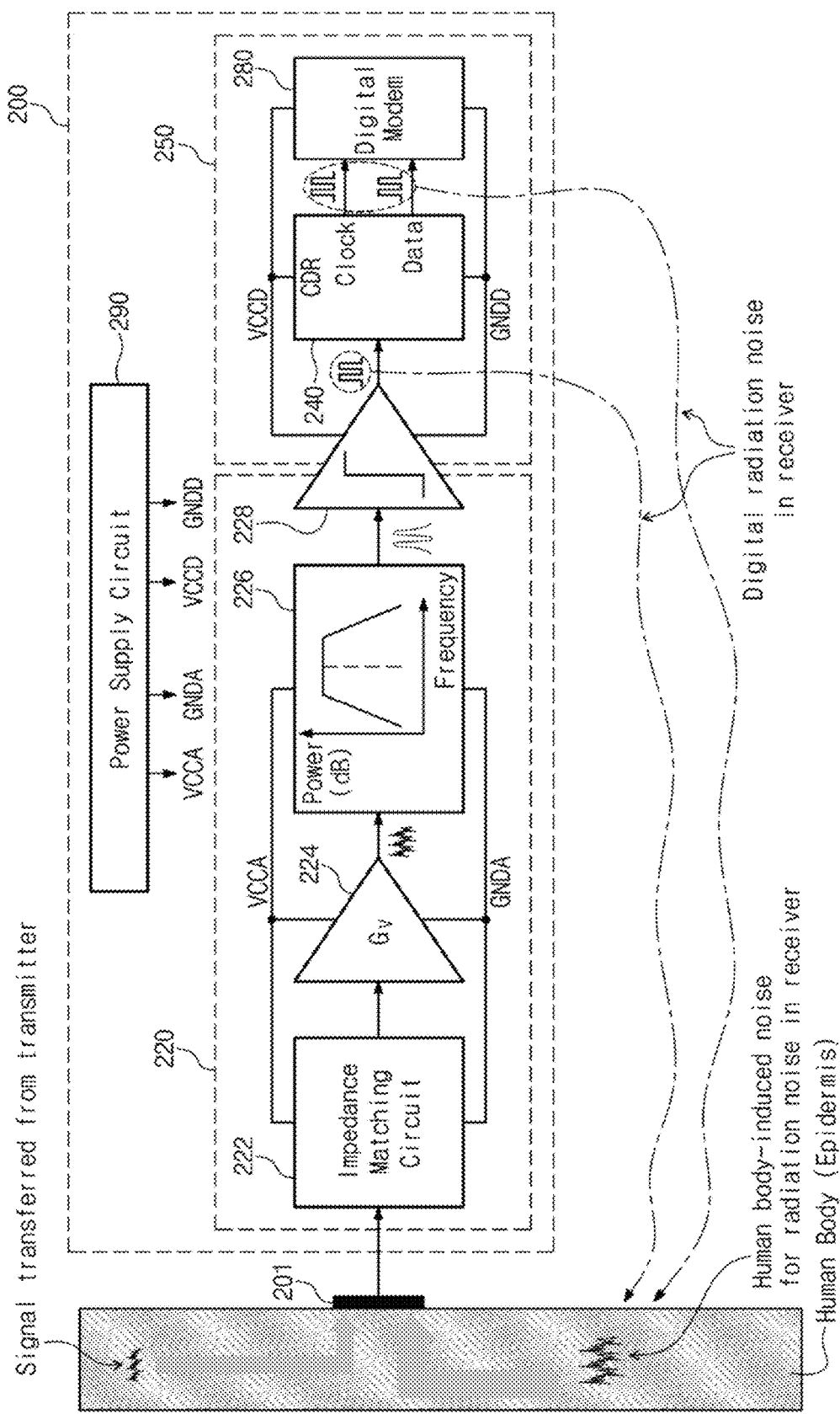
FIG. 3 exemplarily illustrates that a noise is re-amplified by an amplifier of a high gain in a reception stage to cause oscillation at an operation frequency of the reception stage, when a digital noise radiated from the reception stage is flowed into the human body near the reception stage.

FIG. 3 exemplarily illustrates that noise is re-amplified by an amplifier of a high gain in the reception stage to cause oscillation at an operation frequency of the reception stage, when a digital noise radiated from the reception stage is flowed into the human body near the reception stage.

Referring to FIG. 3, a signal transmitted from the human body 11 through the reception electrode 201 is filtered for only a band of a transmission signal, amplified through the reception stage analog circuit unit 220, and transferred to an input of the comparator 228. The comparator 226 may amplify the transferred signal to a digital signal of a power supply voltage level and a ground level for an input of the clock and data recovery circuit 240. The clock and data recovery circuit 240 may separate a clock signal and a data signal from the received digital signal to transfer the separated signals to the digital modem 280. Signals transferred between the comparator 228, the clock and data recovery circuit 240 and the digital modem 280 may be digital signals.

On the other hand, such digital signals may have a very sharp rising edge and falling edge. In the nature of such a digital signal, at the moment when the rising edge and falling edge transit, a large peak current may be supplied from a digital power supply node or may flow out to a digital ground node. At this point, a noise caused by the large peak current may be radiated in a wavelength form outside the receiver 200 by an electromagnetic propagation phenomenon.

The radiated noise is absorbed again through the epidermis of the human body 11 near the receiver 200, and a noise signal absorbed in this way is transmitted again to the reception stage analog circuit unit 220 of the receiver 200 through an electrode of the receiver 200 and may be amplified to a large signal by the signal amplifying circuit 224 and the band pass filter 226 in the reception analog circuit unit 220. Since the amplification in this way is caused by the digital operation of the receiver 200, the noise signal may exist in a pass band of the band pass filter 226 and may not be filtered out. The noise signal may circulate a continuous closed loop by the above-described mechanism to cause the receiver 200 to finally oscillate.

In particular, when a signal is transmitted from the transmitter 100 through the human body 11 in which an attenuation ratio is very high, the magnitude of the signal transmitted to the reception electrode 201 is very small and thus a signal amplifying circuit 224 of a high gain is necessary. Therefore, since a noise induced by the human body 11 due to a digital radiation noise is also amplified together by the above-described mechanism, use of the signal amplifying circuit 224 of a high gain is limited and performance of the receiver 200 may be also restrictive.

Figure 4:
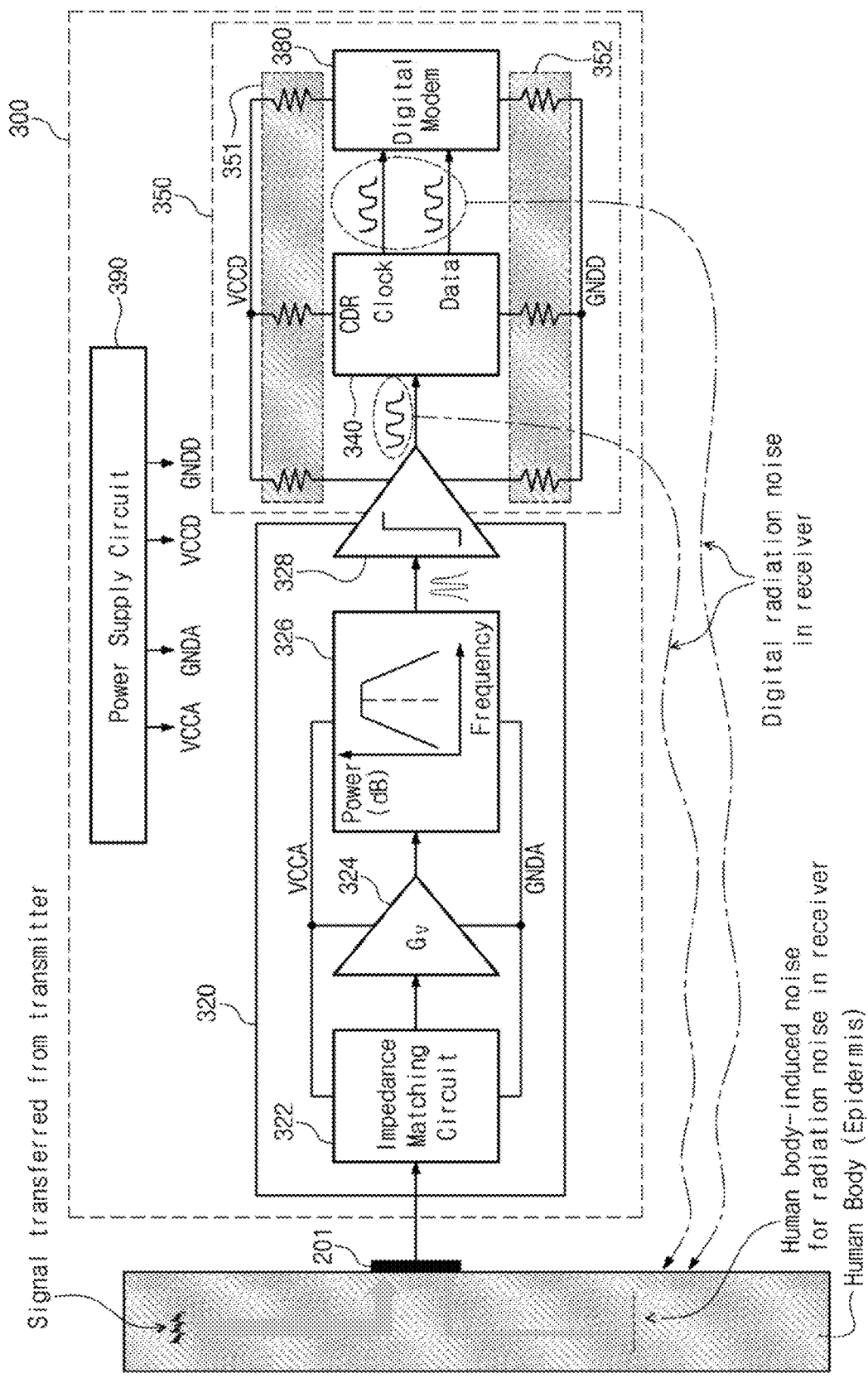
FIG. 4 illustrates a receiver for performing human body communication where the receiver is configured by inserting a resistor for removing reception stage noise radiation into a connection unit between digital power supply and a digital ground in the reception stage according to an embodiment of the inventive concept.

FIG. 4 illustrates a receiver for performing human body communication where the receiver is configured by inserting a resistor for removing reception stage noise radiation into a connection unit between a digital power supply and a digital ground in the reception stage according to an embodiment of the inventive concept.

Referring to FIG. 4, in comparison with the receiver 300 illustrated in FIG. 3, the receiver 300 is different in that the power supply voltage VCCD for digital circuit and the ground voltage GNDD for digital circuit have radiation noise resistors or passive elements having resistance component. The remaining components 320, 322, 324, 326, 328, 349, 380, and 390 may be implemented identically to those illustrated in FIG. 3.

In an embodiment, as illustrated in FIG. 4, each resistor 351 or 352 may be dispersed and provided in the comparator 328, the clock and data recovery circuit 340, and the digital modem 380.

In another embodiment, the radiation noise resistors 351 and 352 may be integrated into one to be connected to a power supply terminal of the power supply voltage VCCD for digital circuit and a ground terminal of the ground voltage GNDD for digital circuit.

A removal mechanism for the digital radiation noise generated in the receiver 400 according to an embodiment of the present inventive concept is as follows. A fundamental cause of the digital noise radiated from the receiver 300 is a large peak current of a power supply terminal, which is generated at a rising edge and a falling edge of the digital signal. Accordingly, when the power supply terminal of the power supply voltage VCCD for digital circuit and the ground terminal of the ground voltage GNDD are respectively provided with resistors 351 and 352 for radiation noise removal as in the present inventive concept, the magnitude of the peak current may be restricted by the resistors.

In nature of the digital signal, since there is not current consumption in a time other than the times of the rising edge and falling edge, the attached resistors limit only the peak current and does not influence on the magnitude of the signal. Since the limited peak current makes slopes of the rising edge and falling edge slow, the radiated digital noise is suppressed and the magnitude of the digital radiation noise of the receiver 300, which flows into the human body 11, may be suppressed or removed. Accordingly, in order to recover a very small reception signal transmitted from the transmitter 100 via the human body 11, the signal amplifying circuit 324 having a high gain may be used. As the result, performance improvement of the receiver 300 may be expected.

Figure 5A:
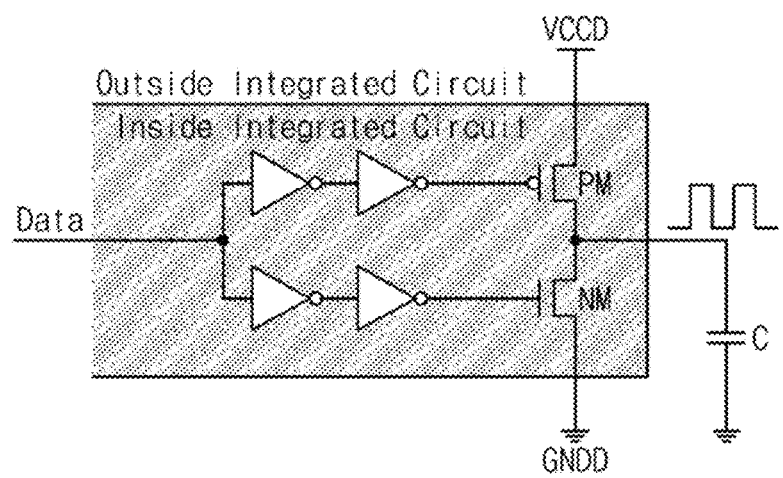
FIG. 5A briefly illustrates a digital signal output circuit and an output signal of a digital component in a typical receiver.

FIG. 5A briefly illustrates a digital signal output circuit and an output signal of a digital component on a typical receiver. Referring to FIG. 5A, the output circuit 251 typically has a large current driving capability in order to drive a capacitance component C of a large load outside an integrated circuit, and the sizes of transistors PM and NM inside a buffer are very large.

Figure 5B:
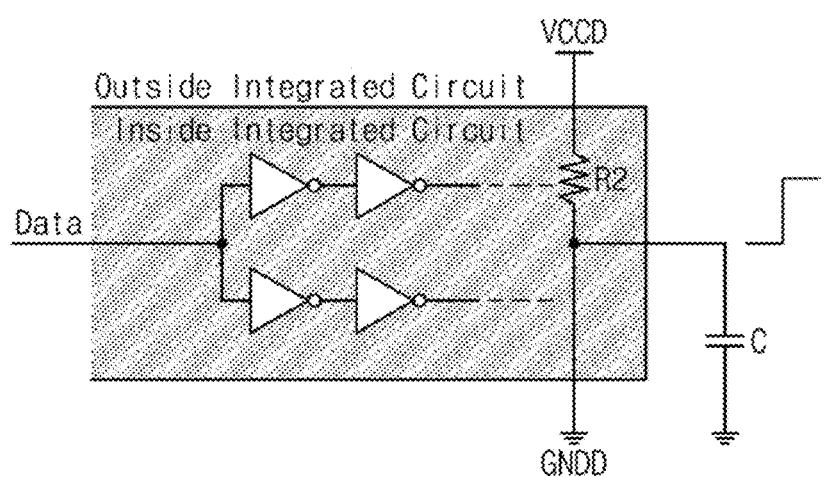
FIG. 5B illustrates an operation and a waveform for driving a digital output high in a digital signal output circuit 251 and an output signal of the digital component in a typical receiver.

FIG. 5B illustrates an operation and a waveform for driving digital output high in a digital signal output circuit 251 and an output signal of the digital component in a typical receiver. FIG. 5B, as illustrated in FIG. 5A, is a simplified view when the output circuit 251 performs a rising edge transition (0→1). At the time of the rising edge transition, a peak current for charging the load capacitance C is determined by the size of an output driver transistor and this may be modeled as a resistor R2. A rising transition peak current IPEAK is to be VCCD/R2 by the Ohm's law. In addition, a transition time constant of the rising edge will be R2×C. A resistance value according to the size of the transistor of the output circuit 251 of an existing digital circuit unit is very small, and according to the above expression, the peak current is large and the time constant is small.

Figure 6A:
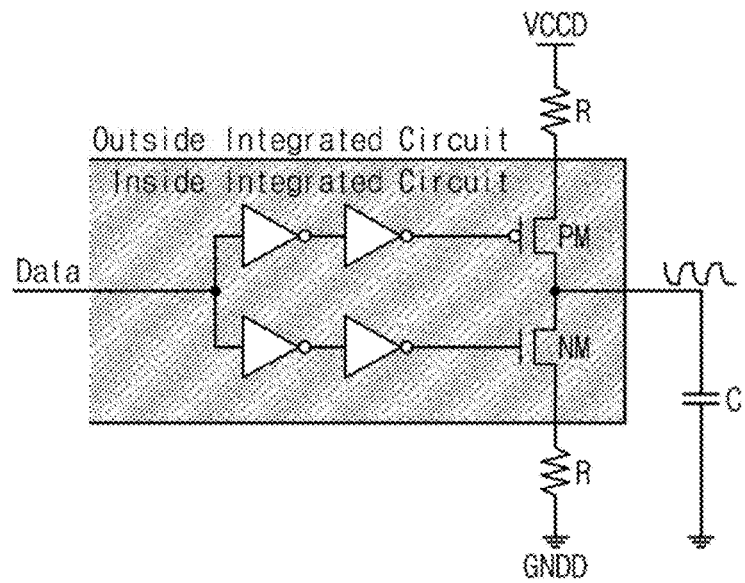
FIG. 6A briefly illustrates a configuration in which a resistor, which is for removing digital noise radiation, is inserted in a receiver according to an embodiment of the inventive concept and a subsequent digital signal output circuit and output signal of digital components in a reception stage.

FIG. 6A briefly illustrates a configuration in which a resistor, which is for removing digital noise radiation, is inserted in a receiver according to an embodiment of the inventive concept and a subsequent digital signal output circuit and output signal of digital components in a reception stage. Referring to FIG. 6A, the comparator 328, the clock and data recovery circuit 340, and the output buffer 351 inside the digital modem integrated circuit used in the receiver 300 for human body communication may further include resistors R for digital radiation noise removal in comparison to those of FIG. 5A.

Figure 6B:
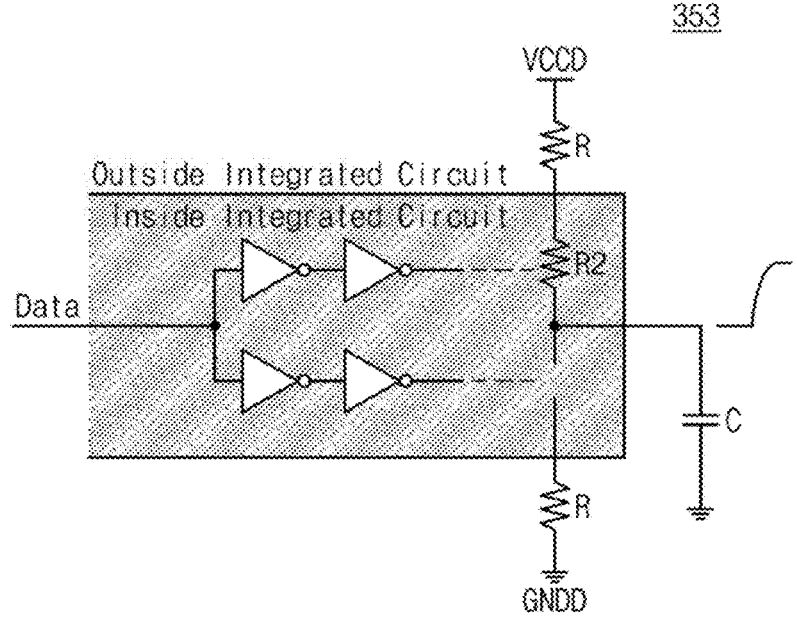
FIG. 6B illustrates an operation and a waveform for driving a digital output high in digital signal output circuits and output signals of respective digital components in a receiver in which a resistor is inserted to remove digital noise radiation according to an embodiment of the inventive concept.

FIG. 6B illustrates an operation and a waveform for driving a digital output high in digital signal output circuits and output signals of respective digital components in a receiver in which a resistor is inserted to remove digital noise radiation according to an embodiment of the inventive concept. Referring to FIG. 6B, an operation is briefly illustrated when the output circuit 353 shown in FIG. 6A performs the rising edge transition (0→1) and when the resistors R for digital radiation noise removal are provided. Unlike a structure of a typical output buffer 251, the peak current for charging the load capacitance C at the time of rising edge transition is determined by a resistor R2 according to the size of the output driver transistor and the digital radiation noise removal resistor R, and when the digital power supply voltage is VCCD, the rising transition peak current IPEAK becomes VCCD/(2R+R2) according to the Ohm's law. In addition, the transition time constant of the rising edge will be (2R+R2)×C.

Since a value of the resistor R for digital noise removal of the inventive concept is larger than a resistance value of the transistor of the output buffer of the typical digital circuit unit, the peak current will be reduced and the time constant will increase according to the above expression.

Figure 7A:
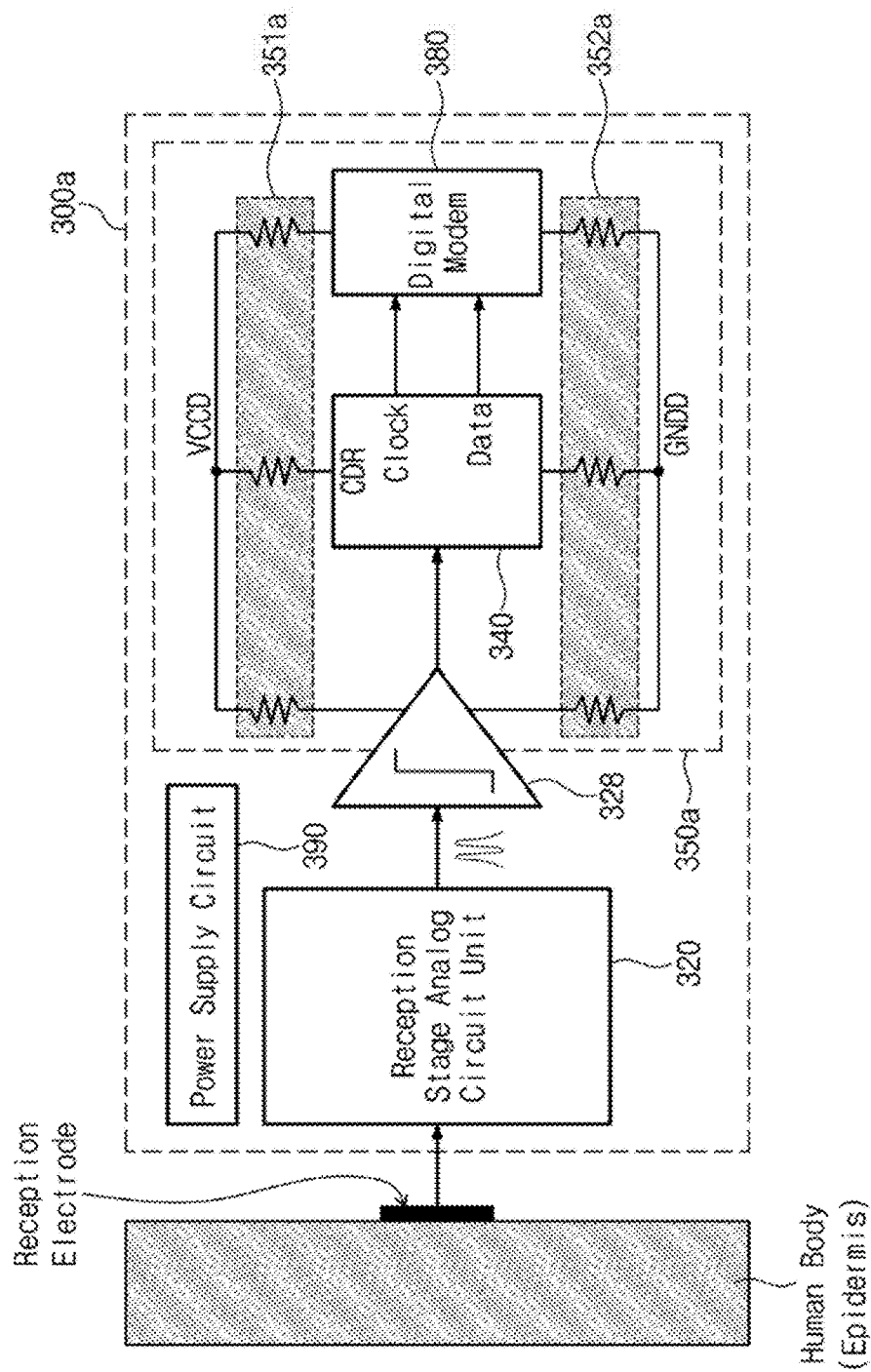
FIG. 7A illustrates an insertion of resistors to a digital power supply and a digital ground in a receiver, when the resistors are inserted to remove reception stage digital noise radiation according to an embodiment of the inventive concept.

FIG. 7A illustrates an insertion of resistors to a digital power supply and a digital ground in a receiver 300a, when the resistors are inserted to remove reception stage digital noise radiation according to an embodiment of the inventive concept. Referring to FIG. 7A, when the resistors are inserted to remove digital noise radiation into the reception stage, resistors 351a and 352a may be inserted between the digital power supply voltage VCCD and a digital component or between the digital component and the digital ground voltage GNDD of the receiver 300. On the other hand, descriptions about remaining components 320, 328, 340, 380 and 390 of the receiver 300a are the same as the above descriptions and will be omitted.

Figure 7B:
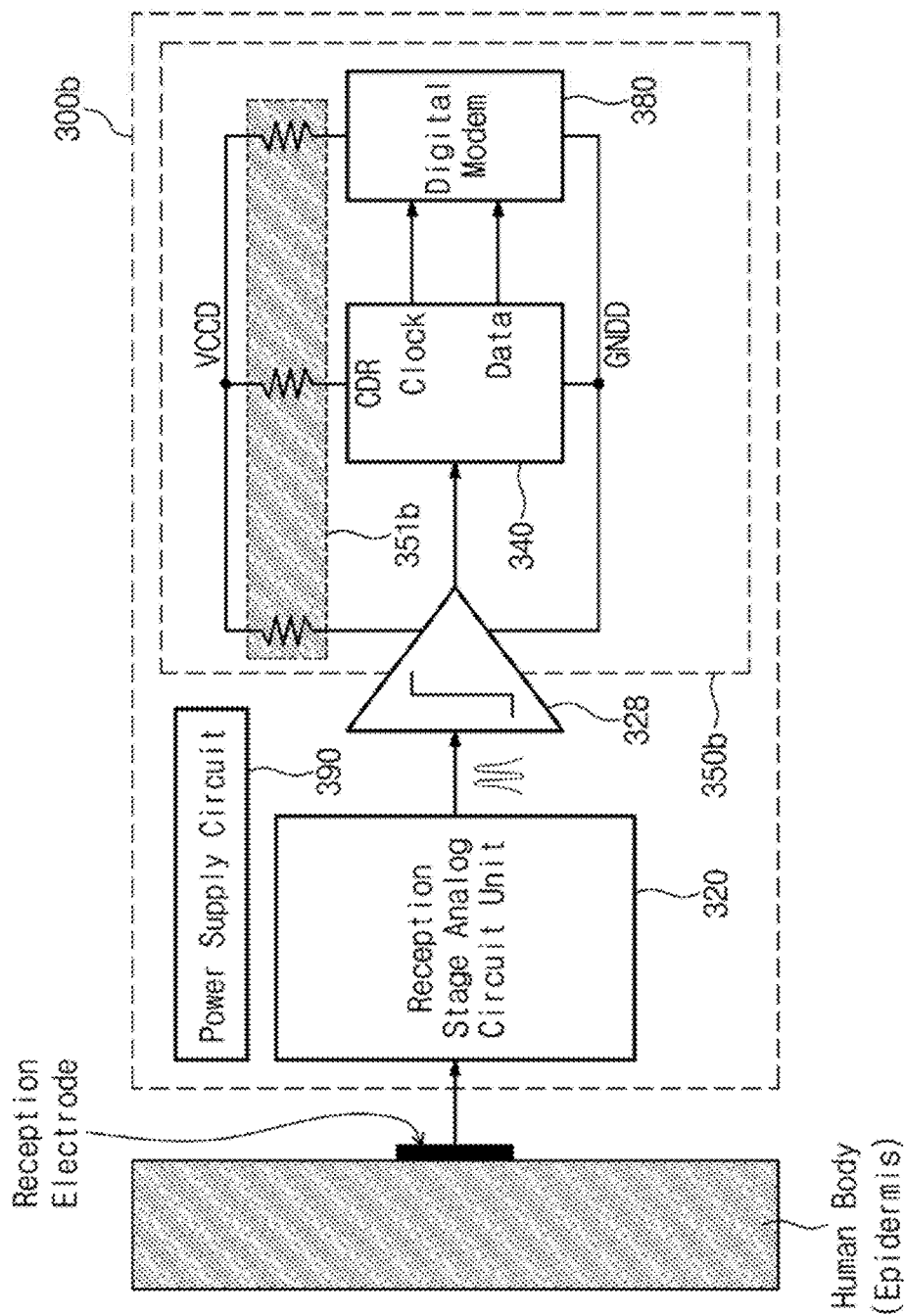
FIG. 7B illustrates an insertion of a resistor to a digital power supply in a receiver, when the resistor is inserted to remove reception stage digital noise radiation according to an embodiment of the inventive concept.

FIG. 7B illustrates an insertion of resistors to a digital power supply voltage VCCD of the receiver 300b, when the resistors are inserted to remove reception stage digital noise radiation according to an embodiment of the inventive concept. Referring to FIG. 7B, when the resistors are inserted to remove digital noise radiation into the reception stage according to an embodiment of the inventive concept, at least one resistor 351b may be inserted between the digital power supply voltage VCCD and the digital component of the receiver 300b. On the other hand, descriptions about remaining components 320, 328, 340, 380 and 390 of the receiver 300b are the same as the above descriptions and will be omitted.

Figure 7C:
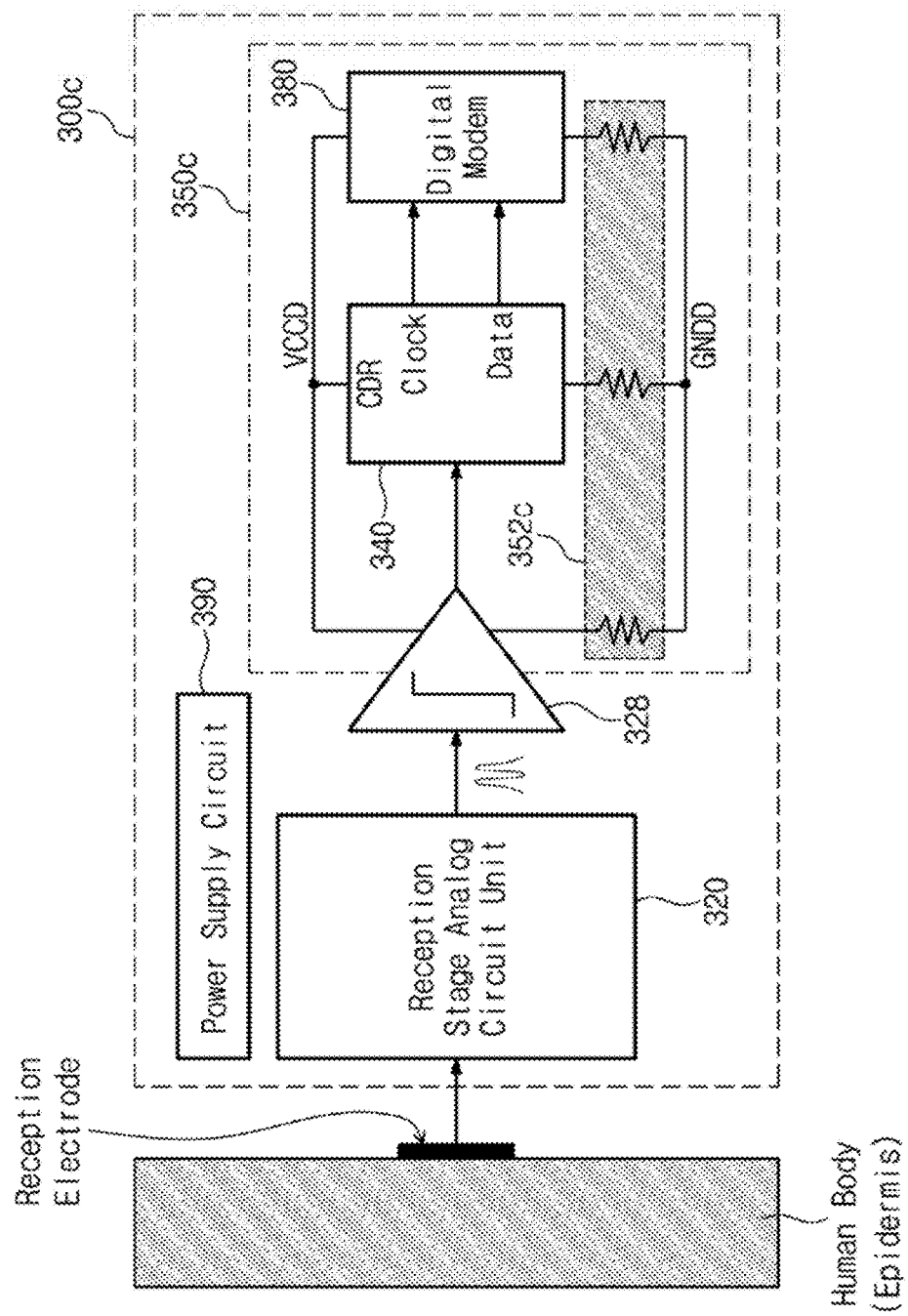
FIG. 7C illustrates an insertion of a resistor to a digital ground in a receiver, when the resistor is inserted to remove reception stage digital noise radiation according to an embodiment of the inventive concept.

FIG. 7C illustrates an insertion of resistors to a digital ground voltage GNDD of the receiver 300c, when the resistors are inserted to remove reception stage digital noise radiation according to an embodiment of the inventive concept. Referring to FIG. 7C, when the resistors are inserted to remove digital noise radiation into the reception stage according to an embodiment of the inventive concept, at least one resistor 351c may be inserted between the digital ground voltage GNDD and the digital component of the receiver 300c. On the other hand, descriptions about remaining components 320, 328, 340, 380 and 390 of the receiver 300c are the same as the above-descriptions and will be omitted.

On the other hand, as illustrated in FIGS. 7A, 7B and 7C, the resistor for radiation digital noise removal in the reception stage may be provided to all or a part of the power supply terminal of the power supply voltage VCCD and the ground terminal of the ground voltage GNDD according to a configuration. In addition, the resistors are respectively provided in components inside the digital circuit unit or each one resistor may be provided to the entire power supply voltage VCCD or the ground voltage GNDD supplied to the digital circuit unit.

Figure 8A:
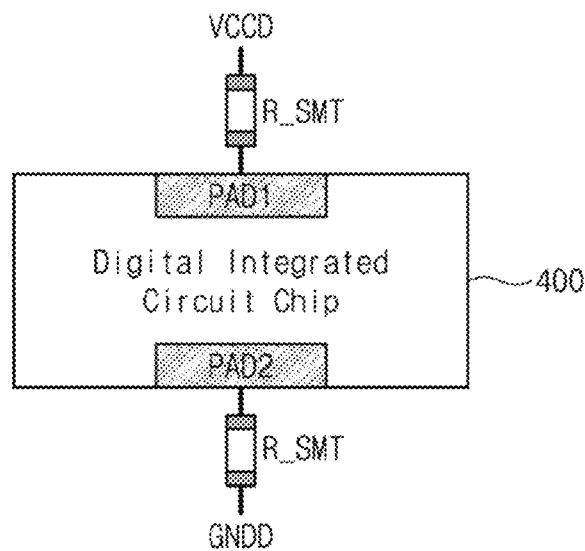
FIG. 8A illustrates an insertion of resistors to a digital power supply terminal and a digital ground outside an integrated chip package of a reception stage, when the resistors are inserted to remove reception stage digital noise radiation according to an embodiment of the inventive concept.

FIG. 8A illustrates an insertion of resistors to a digital power supply terminal and a digital ground outside an integrated chip package 400 of a reception stage, when the resistors are inserted to remove reception stage digital noise radiation according to an embodiment of the inventive concept.

Referring to FIG. 8A, when resistors for digital noise radiation removal in the reception stage are inserted to the configuration, resistors are inserted to all of the digital power supply terminal and the digital ground terminal outside an integrated chip package 400 of the reception stage. In configuring a receiver for human body communication, the receiver may be configured in this way when using a component in which resistors for reception stage radiation noise removal are not provided in the power supply terminal and the ground terminal inside the digital integrated circuit.

In an embodiment, a resistor R_SMT is disposed outside the digital integrated circuit chip 400 to connect between the power supply terminal and a power supply pad PAD1 inside the digital integrated circuit chip 400 or between the ground terminal and a ground pad PAD2 inside the digital integrated circuit chip 400.

In an embodiment, the resistor R_SMT may include a surface mount technology (SMT) resistor.

In an embodiment, the resistor R_SMT may be connected between the power supply terminal and the power supply pad PAD1 inside the digital integrated circuit chip 400 or between the ground terminal and the ground pad PAD2 inside the digital integrated circuit chip 400.

Figure 8B:
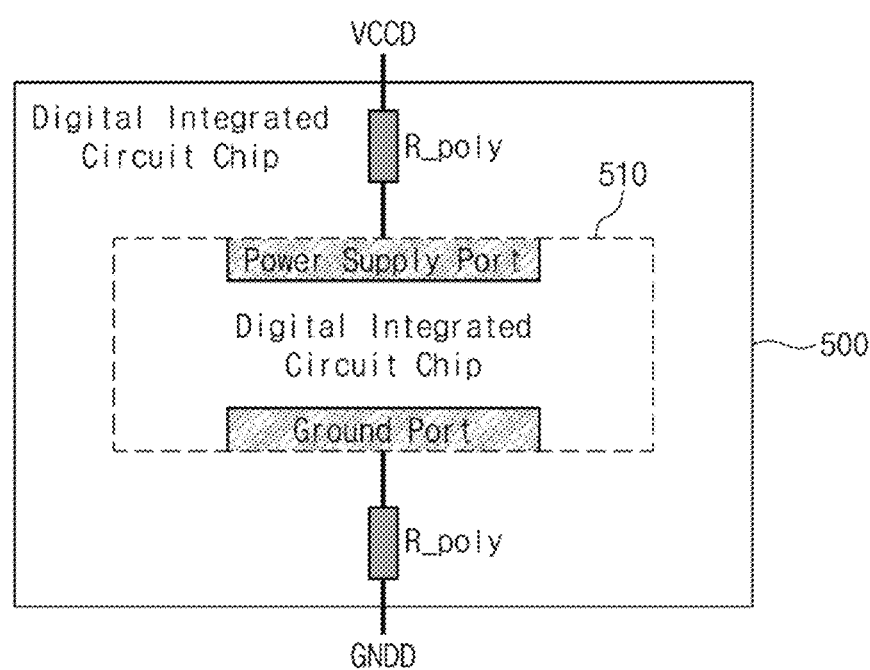
FIG. 8B illustrates that a resistor is formed using poly silicon on an integrated circuit silicon die of a reception stage and inserted, when the resistor is inserted to remove reception stage digital noise radiation according to an embodiment of the inventive concept.

FIG. 8B illustrates that a resistor R_poly is formed using poly silicon on a integrated circuit silicon die 500 of a reception stage and inserted, when the resistor is inserted to remove reception stage digital noise radiation according to an embodiment of the inventive concept.

Referring to FIG. 8B, when a resistor for reception stage digital noise radiation removal is inserted to the configuration, the resistor is formed using polysilicon on an integrated silicon die 500 of the reception stage and inserted thereto.

In an embodiment, the resistor R-poly may include a polysilicon resistor.

In an embodiment, the resistor R_poly is disposed inside the digital integrated circuit chip 500 to connect between the power supply terminal and an IP power port inside the digital integrated circuit chip 500 or between the ground terminal and an IP ground port inside the digital integrated circuit chip 500. In an embodiment, the power supply port and the ground port may be implemented with a metal.

Figure 8C:
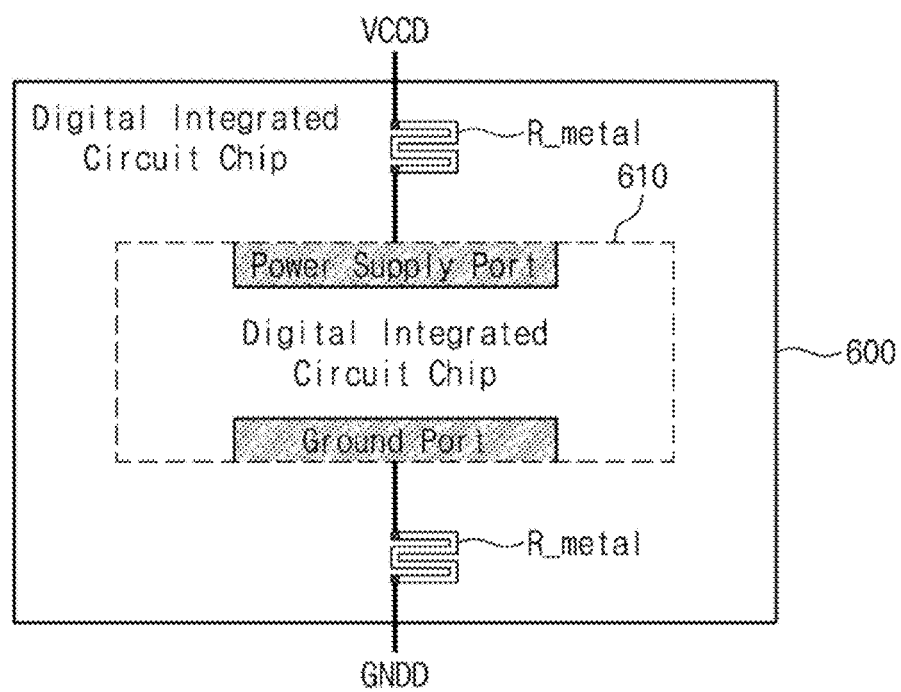
FIG. 8C illustrates that a resistor is formed by connecting a metal line in zigzags on an integrated circuit silicon die of a reception stage and inserted, when the resistor is inserted to remove reception stage digital noise radiation according to an embodiment of the inventive concept.

FIG. 8C illustrates that a resistor is formed by connecting a metal line in zigzags on an integrated circuit silicon die of a reception stage and inserted, when the resistor is inserted to remove reception stage digital noise radiation according to an embodiment of the inventive concept.

Referring to FIG. 8C, when the resistor for digital noise radiation removal in the reception stage is inserted to the configuration, a resistor is formed by connecting a metal line in zigzags on an integrated circuit silicon die 600 of the reception stage and inserted thereto. In configuring a receiver for human body communication, a metal resistor R_metal in which polysilicon or a metal is twisted in zigzags in advance to raise a resistance value is inserted to the power supply port and ground port on the silicon die of an IP 610 of the digital integrated circuit 600.

Figure 9:
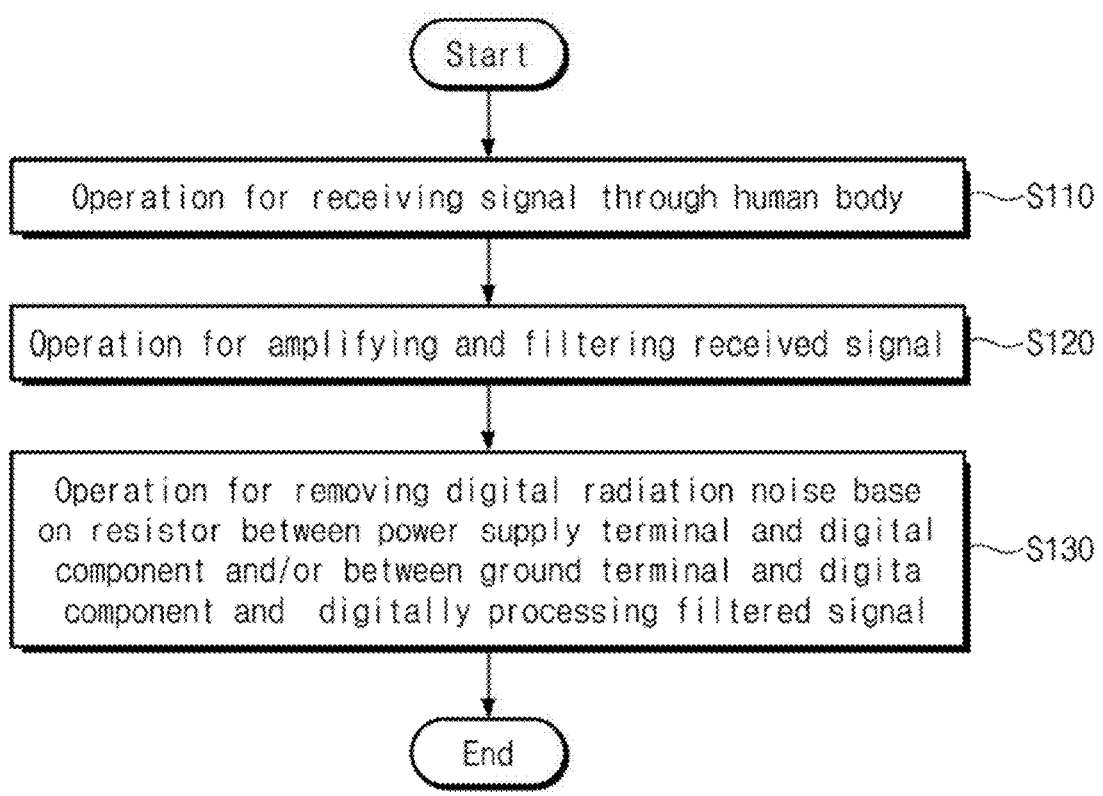
FIG. 9 illustrates an exemplary method for receiving a signal in a receiver of a human body communication system according to an embodiment of the inventive concept.

FIG. 9 illustrates an exemplary method for receiving a signal in a receiver of human body communication system according to an embodiment of the inventive concept. Referring to FIGS. 1 to 9, the reception method is as follows. The reception stage analog signal unit may receive a signal through a human body (operation S110). The received signal may be amplified and filtered at the reception stage analog signal unit (operation S120). Thereafter, the reception digital signal unit may digitally process the filtered signal. At this point, on the basis of the resistor between the power supply terminal and the digital component or between the ground terminal and the digital component, the digital radiation noise may be removed (operation S130).

In the present inventive concept, a signal transmission and reception device using a human body as a medium may include a band pass filter in a receiver, the band pass filter filtering out a noise induced by the human body and having a transmitter's transmission data rate and a transmission frequency as a central frequency, a comparator for converting an analog signal output from the band pass filter into a signal of the magnitude sufficient for driving the clock and data recovery circuit, the clock and data recovery circuit for receiving a digital signal output from the comparator and performing phase and frequency synchronization with a transmitter data transmission rate and a frequency necessary for operation of the receiver, and a clock oscillator which generates a stable clock frequency for the clock and data recovery circuit and which has the same frequency performance as an operation frequency of the transmitter.

In addition, the receiver for human body communication proposed in the present inventive concept is provided with resistors or passive elements playing roles as the resistors for radiation noise removal in the reception stage in the power supply terminal and ground terminal of the digital circuit. Accordingly, the digital circuit unit may be included in which an upper limit value of a current for charging and discharging a load connected to an output terminal of the digital circuit unit inside the receiver is limited according to the values of the resistors, and upper limit values of slopes of rising and falling edge driving of an output signal of a digital circuit unit inside the receiver may be limited according to the values of the resistors.

In addition, the receiver according to an embodiment of the inventive concept may include a digital circuit unit which may also limit, by the values of the resistors, an amount of a digital noise radiated from the receiver as much as the value of the current of which upper limit is limited.

In an embodiment, in realizing a resistor for radiation noise removal in the reception stage, the receiver may include a configuration in which a surface-mounted resistor of a single passive element type connected between a power supply outside a digital integrated circuit chip and a ground pad and printed circuit board (PCB) terminal.

In an embodiment, in realizing a resistor for radiation noise removal in the reception stage, the receiver may include a configuration in which a polysilicon type resistance element is connected between a power supply of a package on a silicon die inside the integrated circuit and a ground pad, and digital driving IP supply terminal.

In an embodiment, in realizing a resistor for radiation noise removal in the reception stage, the receiver may include a configuration in which a connection line having a resistance property is formed by connecting a metal in zigzags between a power supply of a package on a silicon die inside the integrated circuit and a ground pad, and digital driving IP supply terminal.

In an embodiment, an operation frequency of the transmitter, a transmission data rate and a digital block operation frequency of the receiver, and the clock and data recovery circuit inside the receiver may use an identical frequency for synchronization and recovery of transmission/reception signals.

In an embodiment, since the transmitter and the receiver respectively use independent frequency oscillators, minute frequency and phase errors between the transmitter and the receiver may be precisely removed through a clock frequency recovered by the clock and data recovery circuit.

In an embodiment, a pass band central frequency of the band pass filter provided in the receiver may be set to be identical to the operation frequency of the transmitter and the receiver or the data rate of the transmission signal.

In an embodiment, the band pass filter provided in the receiver may determine frequency components other than the operation frequency of the transmitter and the receiver or the data rate of the transmission signal as a noise induced by surroundings of the human body and may remove the noise.

In an embodiment, in order to generate a digital signal provided to the clock and data recovery circuit inside the receiver, an analog output of the band pass filter may be output as an input of the comparator.

In an embodiment, the receiver may include a resistor or a passive element playing a role as a resistor between a power supply terminal of the comparator inside the receiver and the power supply terminal of the PCB or between the ground terminal of the comparator and the ground terminal of the PCB.

In an embodiment, the receiver may include a resistor or a passive element playing a role as a resistor between a power supply terminal of the clock and data recovery circuit (CDR) inside the receiver and the power supply terminal of the PCB or between the ground terminal of the CDR and the ground terminal of the PCB.

In an embodiment, the receiver may include a resistor or a passive element playing a role as a resistor between a power supply terminal of a digital circuit other than the comparator and the CDR inside the receiver and the power supply terminal of the PCB or between the ground terminal of the digital circuit other than the comparator and the CDR and the ground terminal of the PCB.

In an embodiment, in a resistor attachment method for removing digital noise radiation in the receiver, the resistor may be attached to only between a power supply terminal of a circuit and a power supply terminal of the PCB, and the ground terminal of the circuit and the ground terminal of the PCB may be shorted without a resistor attached.

In an embodiment, an upper limit of a current for charging/discharging a load generated at the time of digital signal switching may be limited by including a resistor between the power supply terminal of the circuit inside the receiver and the power supply terminal of the PCB or between the ground terminal of the comparator and the ground terminal of the PCB.

In an embodiment, since the upper limit of the current for charging/discharging the load generated at the time of the digital signal switching is limited, an amount of an induced radiation noise may be limited to a value of the resistor.

In an embodiment, in a resistor attachment method for removing digital noise radiation in the receiver, a resistor may be attached to only between the ground terminal of the circuit and the ground terminal of the PCB, and the power supply terminal of the circuit and the power supply terminal of the PCB may be shorted without a resistor attached.

In an embodiment, in a resistor attachment method for removing digital noise radiation in the receiver, a resistor between the power supply terminal (or ground terminal) outside the digital integrated circuit package and the power supply terminal (or ground terminal) of the PCB may be attached in a surface mount technology type.

In an embodiment, in a resistor attachment method for removing digital noise radiation in the receiver, a resistor between the power supply terminal (or ground terminal) outside the digital integrated circuit die and the power supply terminal (or ground terminal) inside the package may be attached in a polysilicon type.

In an embodiment, in a resistor attachment method for removing digital noise radiation in the receiver, a resistor between the power supply terminal (or ground terminal) outside the digital integrated circuit die and the power supply terminal (or ground terminal) inside the package may be attached with a metal line in zigzags.

A receiver for performing human body communication according to an embodiment of the inventive concept may include an analog circuit unit which is connected between a first power supply terminal and a first ground terminal, receives a signal from a reception electrode attached on a human body, and amplifies and filters the received signal, a digital circuit unit which is connected between a second power supply terminal and a second ground terminal and digitally processes a signal output from the analog circuit unit in the reception stage, and a power supply circuit for generating a first power supply voltage, a second power supply voltage, a first ground voltage, and a second ground voltage, wherein the second power supply voltage is provided to the second power supply terminal via a first resistor or a first passive element, or the second ground voltage is provided to the second ground terminal via a second resistor or a second passive element.

A receiver for performing human body communication according to another embodiment of the inventive concept may include a reception electrode, an impedance matching circuit for receiving a transmission signal from the reception electrode and performing impedance matching, a signal amplifying circuit for amplifying a signal output from the impedance matching circuit, a band pass filter for filtering a signal output from the signal amplifying circuit, a comparator for amplifying a voltage level of a signal output from the band pass filter, a clock and data recovery circuit for recovering data and a clock from a signal output from the comparator by using a reception clock, a digital modem for recovering reception information using the data and clock output from the clock and data recovery circuit, a first power supply terminal for providing a first power supply voltage to the impedance matching circuit, the signal amplifying circuit, and the band pass filter. a second power supply terminal for providing a second power supply voltage to the comparator, the clock and data recovery circuit, and the digital modem, a first ground voltage terminal for providing a first ground voltage to the impedance matching circuit, the signal amplifying circuit, and the band pass filter, a second ground terminal for providing a second ground voltage to the comparator, the clock and data recovery circuit, and the digital modem, and a power supplying circuit for generating the first power supply voltage, the second power supply voltage, the first ground voltage, and the second ground voltage, wherein a first resistor or a first passive element may be connected between the second power supply terminal and at least one of the comparator, the clock and data recovery circuit and the digital modem, and a second resistor or a second passive element may be connected between the second ground terminal and at least one of the comparator, the clock and data recovery circuit and the digital modem.

A signal reception method of a receiver for performing human body communication according to an embodiment of the inventive concept may include amplifying and filtering a signal received from a reception electrode attached on a human body, and removing a digital radiation noise on the basis of a resistor or a passive element between a power supply terminal and at least one of digital components or between a ground terminal and the at least one of the digital components and digitally processing the filtered signal.

Since being provided with resistors in power supply terminals and ground terminals of the comparator or the clock and data recovery circuit and other digital circuits, the receiver of the inventive concept may provide an effect of removing or suppressing a digital noise radiated from the receiver according to values of the resistors.

In addition, the receiver of the inventive concept may use oscillators having the same frequency for stable data transmission or recovery at the time of transmission or reception, and the central frequency of the band pass filter provided in the receiver may also be set to the same frequency.

In addition, the receiver of the inventive concept may suppress or minimize an influence due to noise that is radiated from the receiver and flowed into the human body, and accordingly, a gain of an internal amplifier in the receiver may be set to be high in order to raise reception sensitivity of signals transmitted from a transmitter.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A receiver for performing human body communication, the receiver comprising:
   a reception electrode attached on a human body;
   an impedance matching circuit configured to receive a transmission signal from the reception electrode and perform impedance matching;
   a signal amplifying circuit configured to amplify a signal output from the impedance matching circuit;
   a band pass filter configured to filter a signal output from the signal amplifying circuit;
   a comparator configured to amplify a voltage level of a signal output from the band pass filter;
   a clock and data recovery circuit configured to recover data and a clock from a signal output from the comparator using a reception clock;
   a digital modem configured to recover reception information from the data and the clock output from the clock and data recovery circuit;

a first power supply terminal configured to provide a first power supply voltage to the impedance matching circuit, the signal amplifying circuit and the band pass filter;

a second power supply terminal configured to provide a second power supply voltage to the comparator, the clock and data recovery circuit, and the digital modem;

a first ground terminal configured to provide a first ground voltage to the impedance matching circuit, the signal amplifying circuit and the band pass filter;

a second ground terminal configured to provide a second ground voltage to the comparator, the clock and data recovery circuit, and the digital modem; and a power supplying circuit for generating the first power supply voltage, the second power supply voltage, the first ground voltage, and the second ground voltage, wherein a first resistor or a first passive element is connected between the second power supply terminal and at least one of the comparator, the clock and data recovery circuit and the digital modem, and a second resistor or a second passive element is connected between the second ground terminal and at least one of the comparator, the clock and data recovery circuit and the digital modem.

2. The receiver of claim 1, wherein at least one of the comparator, the clock and data recovery circuit and the digital modem comprises an output circuit configured to output data, the output circuit comprises a first transistor configured to be connected between the first resistor and an output terminal, and a second transistor configured to be connected between the output terminal and the second resistor, and a capacitor connected between the output terminal and the second ground terminal.

3. The receiver of claim 2, wherein the output circuit is disposed inside any one integrated circuit, and the first resistor, the second resistor, and the capacitor are disposed outside the one integrated circuit.

4. The receiver of claim 2, wherein the output circuit is disposed inside any one integrated circuit, the first and second resistors are disposed inside the one integrated circuit, and the capacitor is disposed outside the one integrated circuit.

* * * * *